US008965871B2

(12) United States Patent
Kelley et al.

(10) Patent No.: US 8,965,871 B2
(45) Date of Patent: Feb. 24, 2015

(54) SYSTEM AND METHOD FOR PROVIDING TARGETED CONTENT TO A USER BASED ON USER CHARACTERISTICS

(75) Inventors: Mark Kelley, San Diego, CA (US); Steven John Caliguri, Poway, CA (US); Souheil Gallouzi, San Diego, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 13/166,708

(22) Filed: Jun. 22, 2011

(65) Prior Publication Data

US 2012/0131136 A1 May 24, 2012

Related U.S. Application Data

(63) Continuation of application No. 10/624,085, filed on Jul. 21, 2003, now abandoned.

(60) Provisional application No. 60/398,215, filed on Jul. 23, 2002.

(51) Int. Cl.
*H04L 29/08* (2006.01)
*G06Q 30/02* (2012.01)
(Continued)

(52) U.S. Cl.
CPC ............... *H04L 67/20* (2013.01); *G06Q 30/02* (2013.01); *H04W 4/18* (2013.01); *H04L 67/306* (2013.01); *H04W 4/02* (2013.01)
USPC ........... 707/706; 707/723; 707/780; 709/217; 709/220; 709/224; 705/14.4; 705/14.41

(58) Field of Classification Search
CPC ................ G06F 17/30867; G06F 17/30766; G06F 17/30761; G06F 17/30035; G06F 17/30702; G06F 17/30; G06F 15/16; H04W 3/42; H04W 8/18; H04Q 7/20; H04L 67/14; H04L 67/104; H04L 67/306; G06Q 30/02; H04N 4/02
USPC .......... 707/706, 723, 780, E17.108, E17.109; 709/201, 206, 208, 224, 217, 221, 220, 709/203; 705/14.4, 14.41, 14.49, 14.67, 705/14.73; 455/403, 414, 428, 445
See application file for complete search history.

(56) References Cited

U.S. PATENT DOCUMENTS

| | | | | |
|---|---|---|---|---|
| 5,724,521 A | * | 3/1998 | Dedrick | 705/26.1 |
| 5,758,938 A | * | 6/1998 | Osterwisch | 353/3 |
| 5,761,662 A | | 6/1998 | Dasan | |

(Continued)

OTHER PUBLICATIONS

V. Belcastro, A. Dutkowski, W. Kaminski, M. Kowalewski, C. L. Mallamaci, S. Mezyk, T. Mostardi, F. P. Scrocco, W. Staniszkis, G. Turco—"An overview of the distributed query system DQS" Advances in Database Technology-EDBT '88 Lecture Notes in Computer Science Volume 303, 1988, pp. 170-189.*

(Continued)

*Primary Examiner* — Anh Ly
(74) *Attorney, Agent, or Firm* — Hartman & Citrin LLC

(57) ABSTRACT

A system and method for providing a personalized advertisement for a good or service for display to a user is described. The system includes a communications device operated by the user; a virtual person database comprising information about the user; and a search engine useful for finding advertisements of interest to the user and generating personalized advertisements for display on the communications device.

18 Claims, 5 Drawing Sheets

(51) Int. Cl.
*H04W 4/18* (2009.01)
*H04W 4/02* (2009.01)

(56) References Cited

U.S. PATENT DOCUMENTS

| | | | |
|---|---|---|---|
| 5,809,242 A | | 9/1998 | Shaw et al. |
| 5,812,126 A | * | 9/1998 | Richardson et al. ......... 715/741 |
| 5,855,015 A | | 12/1998 | Shoham |
| 5,909,589 A | * | 6/1999 | Parker et al. .................... 712/32 |
| 5,974,398 A | * | 10/1999 | Hanson et al. ............. 705/14.64 |
| 6,134,532 A | * | 10/2000 | Lazarus et al. ............. 705/14.25 |
| 6,311,194 B1 | * | 10/2001 | Sheth et al. ............ 707/E17.095 |
| 6,327,574 B1 | | 12/2001 | Kramer et al. |
| 6,356,893 B1 | * | 3/2002 | Itakura et al. ................. 709/217 |
| 6,363,419 B1 | * | 3/2002 | Martin et al. ................. 709/219 |
| 6,493,327 B1 | | 12/2002 | Fingerhut |
| 6,869,018 B2 | | 3/2005 | Fifield et al. |
| 6,907,581 B2 | * | 6/2005 | Noy et al. ..................... 715/863 |
| 7,007,074 B2 | * | 2/2006 | Radwin ......................... 709/217 |
| 7,424,439 B1 | * | 9/2008 | Fayyad et al. ................ 705/7.33 |
| 7,548,928 B1 | * | 6/2009 | Dean et al. ............. 707/999.101 |
| 2001/0036226 A1 | * | 11/2001 | McLaughlin et al. ........ 375/222 |
| 2002/0046102 A1 | * | 4/2002 | Dohring et al. ................. 705/14 |
| 2002/0049745 A1 | * | 4/2002 | Yuichiro et al. .................. 707/1 |
| 2002/0059387 A1 | * | 5/2002 | Wolfe .......................... 709/206 |
| 2002/0112240 A1 | * | 8/2002 | Bacso et al. .................... 725/47 |
| 2002/0123928 A1 | * | 9/2002 | Eldering et al. ................. 705/14 |
| 2002/0128908 A1 | * | 9/2002 | Levin et al. ..................... 705/14 |
| 2002/0131136 A1 | * | 9/2002 | Tokunaga ..................... 359/204 |
| 2003/0016252 A1 | * | 1/2003 | Noy et al. ..................... 345/856 |
| 2003/0032409 A1 | * | 2/2003 | Hutcheson et al. ........... 455/414 |
| 2003/0037041 A1 | * | 2/2003 | Hertz ................................ 707/1 |
| 2003/0050863 A1 | | 3/2003 | Radwin ........................... 705/27 |
| 2003/0067554 A1 | * | 4/2003 | Klarfeld et al. ................. 725/46 |
| 2003/0236770 A1 | * | 12/2003 | Kurapati et al. .................. 707/2 |
| 2004/0147265 A1 | * | 7/2004 | Kelley et al. ................. 455/445 |
| 2006/0230053 A1 | * | 10/2006 | Eldering ...................... 707/101 |
| 2007/0016476 A1 | * | 1/2007 | Hoffberg et al. ................ 705/14 |
| 2007/0233571 A1 | * | 10/2007 | Eldering et al. ................. 705/14 |
| 2008/0294584 A1 | * | 11/2008 | Herz ............................... 706/46 |
| 2010/0332583 A1 | * | 12/2010 | Szabo .......................... 709/202 |
| 2012/0131136 A1 | * | 5/2012 | Kelley et al. ................. 709/217 |

OTHER PUBLICATIONS

Dua, S.; Eungchun Cho; Iyengar, S.S.—"Discovery of Web frequent patterns and user characteristics from Web access logs: a framework for dynamic Web personalization"—Application-Specific Systems and Software Engineering Technology, 2000. Proceedings. 3rd IEEE Symposium on—Mar. 24-Mar. 25, 2000 (pp. 3-8).*

Agrawal, et al., On Integrating Catalogs, WWW10, May 1-5, 2001, Hong Kong. ACM 1-58113-348-0/01/0005.

* cited by examiner

SYSTEM AND METHOD FOR PROVIDING TARGETED CONTENT TO A USER BASED ON USER CHARACTERISTICS

CROSS REFERENCE TO RELATED APPLICATIONS

This application is a continuation of and claims the benefit of the priority of U.S. patent application Ser. No. 10/624,085, filed Jul. 21, 2003, now abandoned, and entitled "SYSTEM AND METHOD FOR AN ADAPTIVE USER COMMUNICATIONS DEVICE," which claims the benefit of priority of U.S. Provisional Patent Application Ser. No. 60/398,215 entitled "SYSTEM AND METHOD FOR AN ADAPTIVE USER COMMUNICATIONS DEVICE" filed Jul. 23, 2002, each of which is hereby incorporated by reference.

BACKGROUND OF THE INVENTION

1. Field of the Invention

The invention relates to the adaptive behavior in a communications device, and, more specifically, to the personalization of, and targeting of content, such as advertisements, to, a mobile communication device.

2. Description of the Background

The sending of messages, content, and/or advertisements for products and services to potential consumers, such as via handheld wireless communication devices, is well known. These messages, content, and/or advertisements are, in general, sent with the hope that the received message, content, or advertisement will be relevant to the needs of the handheld wireless device user, and thus will generate a desired response from the user, such as by a purchase by the user of the advertised product. Messages or content may be targeted to a potential consumer based, for example, on the location of the wireless device. These messages may provide the consumer with advertisements for the local community wherein the handheld wireless device is located, for example.

Unfortunately, messages and advertisements may be ignored by the potential customer due to a lack of then-current interest in the product or service. This may result from a poor selection of messages and/or advertisements, such as messages and/or advertisements for products or services that the potential consumer does not need or desire. Improvement to the targeting is necessary to more effectively select messages that have a greater probability of being favorably received by the consumer. This improvement in targeting necessitates an increased knowledge of the potential customer's buying habits, interests, background, advertising responsiveness, location, and schedule.

Thus, a need exists to improve knowledge of a customer's buying habits, interests, background, advertising responsiveness, location, schedule, and propensities in order to more effectively target messages and/or advertisements to the customer operating a communications device.

SUMMARY OF THE INVENTION

A targeting system for adapting a device to a user is disclosed. The targeting system includes at least one communications device in communication with at least one network, a virtual database accessible to at least one of the at least one communications device over the at least one network, and a searcher that provides content to the communications device over the at least one network, in accordance with the virtual database. The at least one communications device may include a wireless communications device.

A communication network for providing a personalized targeted message to a user is disclosed. The network includes a communications device operated by the user, a virtual database including at least one characteristic about the user, a searcher having access to a plurality of targeted messages and to the virtual database, wherein the searcher filters at least one of the targeted messages that is of interest to the user according to at least one of the at least one characteristics, and wherein the searcher communicates the at least one targeted message of interest to the communications device for provision to the user.

A method of targeting content to a user of a communications device is disclosed. The method includes building a virtual database of information regarding the user, modeling at least one probabilistic behavior of the user, in accordance with the virtual database, searching for content targeted to the at least one modeled probabilistic behavior, and providing the content to the communications device.

Thus, the present invention provides improved knowledge of a customer's buying habits, interests, background, advertising responsiveness, location, schedule, and propensities in order to more effectively target messages, content, and/or advertisements to the customer operating a communications device.

BRIEF DESCRIPTION OF THE DRAWINGS

Understanding of the present invention will be facilitated by consideration of the following detailed description of the present invention taken in conjunction with the accompanying drawings, in which like numerals refer to like parts, and wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical communications system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
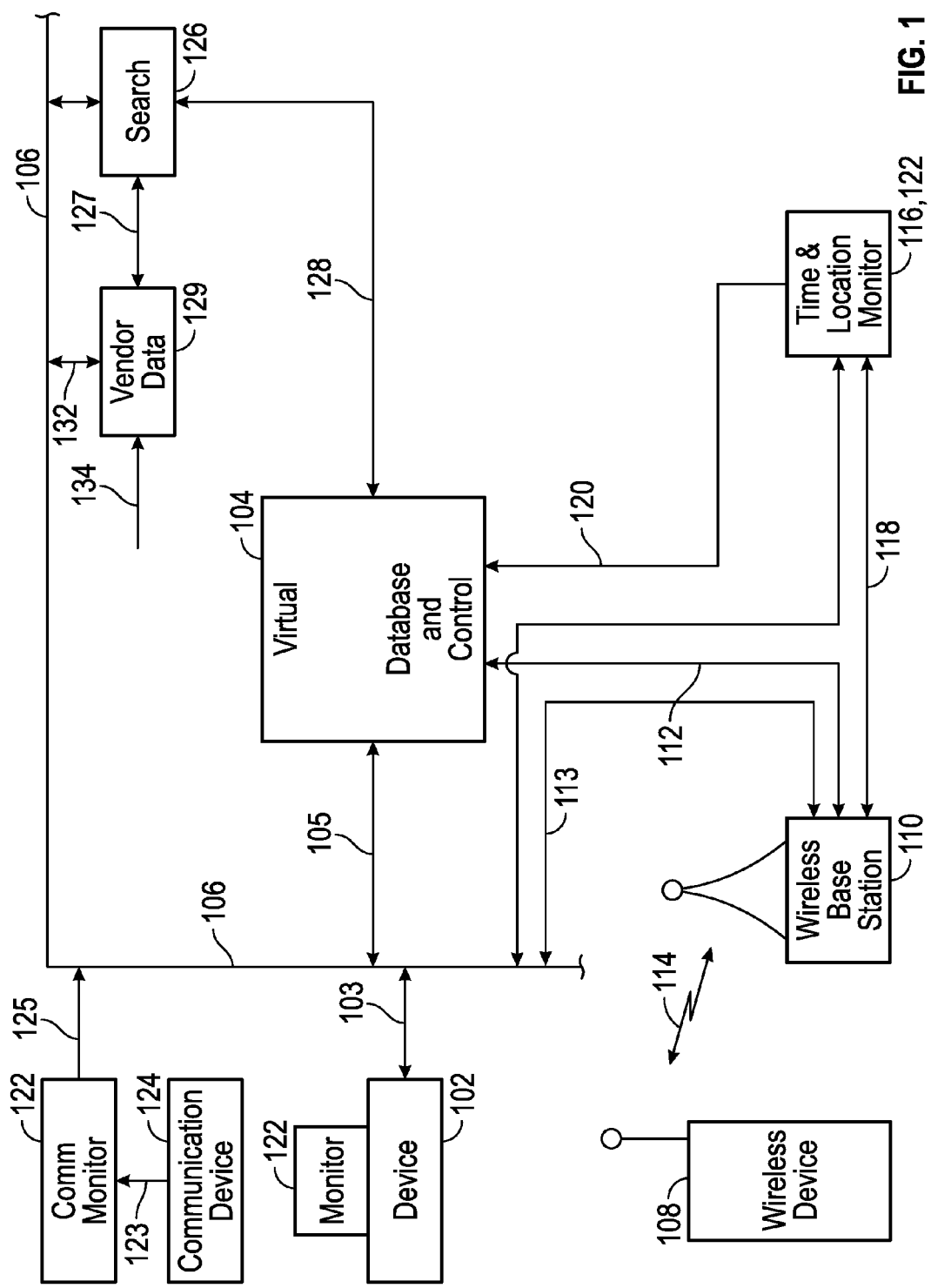
FIG. 1 is a block diagram of the present invention.

FIG. 1 is a block diagram illustrating a targeting system for adapting a device to a user. The targeting system may include a communications device in communication with a network, such as an internet, an intranet, a direct dial-in network, a wireless network, or the like, a virtual database, which may include a heuristic modeler, a virtual searcher, and a content filter.

The communication device 102, 108, 124 displays personalized messages, content, and/or advertisements to the user of the device. The communication device may be a computer, television, wireless device, or the like, for example. The wireless device 108 may be, for example, a cellular telephone, a programmable digital assistant, a short range wireless device, or other wireless device, such as a web-enabled wireless device. The wireless device 108 may preferably be a mobile, hand-held device, although it may be a laptop computer having a wireless modem, for example. Additionally, the communications device may be a terminal-only device, such as a television set or network terminal.

Use of the communication device 102, 108, 124 may populate the virtual database 104, which may include a heuristic modeler. A virtual database, as used herein, may include, for example, a database, a relational database, a database server, a server farm, or the like. Searcher 126 produces information relevant to the user in accordance with information in database 104. Information may be entered into the virtual database 104 over network 106, such as by the user, such as via a personal computer, or other type of computer terminal, connecting to a network access point, such as access point 103, 125, such as an internet connection, and thereby connecting to network 106. A virtual database interface 105 may communicatively connect the virtual database to the network 106, via, for example, a one or a two way communicative connection. It should be noted that although the network 106 is shown as a single line with a distinct number of nodes, it will be apparent to one skilled in the art that a network, such as the internet, may have a great number of available nodes, ports and/or lines. For example, the user may, via the network 106, log onto a site that is associated with and/or communicatively connected to the virtual database 104 via any available methodology, and may subsequently be allowed to generate a personal profile for storage into the virtual database 104. More specifically, for example, the user may communicate with the virtual database 104 via the air interface link 114 via the wireless base station 110 via the network 106. The air interface link may be, for example, an RF, optical, or other format or protocol known to those of skill in the art.

Information about a device, such as wireless device 108, may be exchanged between an intermediary, such as the wireless base station 110, and a time and location monitor 116, via a link 118. It will be apparent to those skilled in the art that link 118 may be a wired link, wherein the time and location monitor is co-located with, for example, the base station 110, or may be a networked or wireless link. The time and location monitor 116 may provide time and/or location information to the virtual database 104 over a link, such as link 120, as will be apparent to those skilled in the art. This time and/or location information may relate to the then-current time and location of a device, such as wireless device, as assessed at the wireless device 108, or at the at least one base station 110, or may relate to a batched history of time and/or location information for at least one device, such as wireless device 108. Time and/or location information may include times of telephone operation, time of calls, time of calls to particular numbers, and/or time of calls for particularly assessed purposes, or time of internet use, or time of internet sites visited, or times of television watching, or particular television programs watched at particular times, or particular channels watched at particular times, and/or location at which, or to which, activities occur, thereby allowing for the virtual database 104 to include time and position sensitive information, such as patterns of travel over time, or approximate hours of awakening, sleeping, working, playing, and the like, or when, to where, how often, and to whom cellular calls are made, or emails are sent, for example.

Time and location monitor 116 is an exemplary embodiment of a monitoring device 122. A monitoring device 122 may include, for example, a web-enabled device, or a wireless device, or a T1 or other hard-wired connection device, such as a television channel monitoring device, to record the activity on a television 124 in order to provide information on viewing habits, for example, or a telephone monitor to record telephonic activity, such as over a landline telephone 124, or an internet monitor to record internet viewing habits over a computer 124, or a purchasing monitor, such as a credit card machine 124, to track purchases at a particular store or stores by a particular user or users, or a monitor to track interrelations between users, such as by telephone or over the internet. Communications device, such as device 124, may provide data to the monitoring device 122 via a link, such as link 123, via, for example, a wireless or a hard-wired connection. Monitoring device 122 may provide data to the virtual database 104 via link 125, such as an internet link 125 through the network 106. A networked link, or a non-wired link, or a non-networked link, including an RF or optical link, may couple the monitor 122 to the virtual database 104. The data provided may include, for example, portions of television programs, or television advertisements or internet advertisements, viewed, skipped over, or fast-forwarded through, such as via the use of tracking technologies, such as TiVo®, for example. Device monitors will be apparent to those of ordinary skill in the art, and each device monitor may include therein, for example, at least one database, such as a relational database, and/or at least one storage memory, and/or at least one batching memory.

Virtual database 104 may include therein a plurality of memories, processors, databases, comparators, or models, such as at least one overall model of at least one user, for example. Virtual database 104 may house data collected from user input on communications devices 108, 102, 124, and/or data on actual transactions of the user using the devices, as assessed via monitors 116, 122. The virtual database 104 may additionally include user profile information, wherein the user is uniquely known based on the user profile information, and wherein the profile information is entered by the user, such as in response to a series of registration questions to register for wireless service, or Internet service, or internet site and/or over a wireless device, or wherein the profile information is entered, for example, by a registration agent receiving information from a registering user. User information may include the name, address, date of birth, marital status, economic, social, education, and/or responses to additional questions that will be apparent to those skilled in the art. Alternatively, the use of user profile questions may be minimized in an embodiment wherein certain user information may be hueristically estimated, as set forth further hereinbelow, or wherein the maintenance of detailed personal information is not desired. For example, in certain embodiments of the invention herein, detailed personal information necessary may be minimized, such as wherein the invention employs only age, or only location, or only time information to make decisions on the needs and/or desires of the user, such as decisions on desired searches of the user. Data forwarded to the database 104 may be permanently stored, or may be real time cached, such that actual incoming data is stored only for a time period necessary to update an overall model within the virtual database, as set forth more fully hereinbelow.

Questions may be posed from and/or by the virtual database 104 to discover information and trends about buying habits or interests, such as questions inquiring about the typical mode of dress, or hobbies, for a user. Questions may additionally include the time, content and location of meals normally eaten by the user, or the time and location of hobbies that the user enjoys, for example. Questions may additionally include the timing, location, and frequency of services that the user usually employs, such as hair care, automobile maintenance, home improvement or maintenance, dry cleaning, food service, pet grooming, home or office cleaning, and/or banking services, for example. Additional questions may include the geography and timing of daily travels, such as a work and home location, or repetitious visitations to friends, family, business associates, and the like. Questions may, for example, assess specific tastes in certain products, such as shoes, clothing, meals, housing, types of flowers or other gifts for family, friends, or business associates, or the special dates that the user may deem important such as birthdates, anniversaries, graduation dates, vacations and holidays. Other question types will be apparent to those skilled in the art.

Responses to questions may be permanently stored, such that questions need not be responded to repeatedly, and questions may be updated, or new questions may be added, periodically. Alternatively, question responses may be used only to build an overall model, as discussed hereinbelow, and those responses that change or contribute to the overall model may not be stored apart from the changes to the overall model. Additionally, as set forth hereinabove and hereinbelow, certain questions may be eliminated in an embodiment wherein responses to certain questions may be heuristically estimated, or questions may be minimized or eliminated in an embodiment wherein minimal information is necessary, or wherein a majority of information is automatically or heuristically provided, in order to provide the overall model for selection of a particular search. For example, a user may be located as to time and geography, as set forth hereinabove, and may be asked only whether the user is hungry. If the user replies with a restaurant suggestion request, or if the user automatically receives a restaurant suggestion message in response to a "Yes, I am hungry" response, and/or positively responds by engaging in eating at the suggested restaurant, as assessed by a device monitor, the overall model of that person as a late night eater may be updated, and the actual time, location, and positive restaurant response may, or may not, be permanently stored, or real-time cached for a period sufficient to allow for an updating of the overall model to include "late-night eater".

It will be apparent to those skilled in the art that privacy of profile information is protected in the present invention, using methodologies known to those skilled in the art. For example, the information provided to the virtual database is preferably not directly accessible outside of services provided by the present invention, or outside of those providing the services and/or apparatus of the present invention, to thereby ensure privacy of information, and may, in certain embodiments, not be forwarded to third parties for purposes not approved by a user. Information may additionally be protected, for example, through the use of data encrypting or proxy servers, such as over links, including those links between network 106 and virtual database 104.

The virtual database 104 thus may include personal habit, travel, buying, and other highly tailored information criteria for each user within the database 104, to thereby allow for targeting by searcher 126, or may include minimal information necessary to identify at least one user for message targeting by searcher 126. If the user does not provide all necessary and/or desired information to the database 104, such as wherein the user is reluctant to provide such information, heuristic model within and/or in communication with the database 104 may collect behavioral data of the user via the communicative transactions with the communication monitors 116, 122, for example, or may access generally available data, and may use this information to estimate user responses to unanswered and/or unasked questions. The heuristic model adaptively modifies the virtual database 104, in accordance with user behavior, such as in accordance with known similar behavior patterns. The heuristic model adapts the virtual database 104 to the actual transactional behavior of the user, or to an estimated transactional behavior based upon the actual transactional behavior. For example, by knowing the location of the home and office of a user, the heuristic model may estimate a route that the user may travel from office to home, and thereby may prompt generation of a traffic alert message to that user in accordance with traffic information assessed, for example, via the searcher 126, in accordance with the heuristically generated data, as set forth more fully hereinbelow. The heuristic model may include, for example, a plurality of databases including heuristic data, accessible to at least one database including user specific data, which access may be provided relationally, such as through a comparator, for example.

Figure 2:
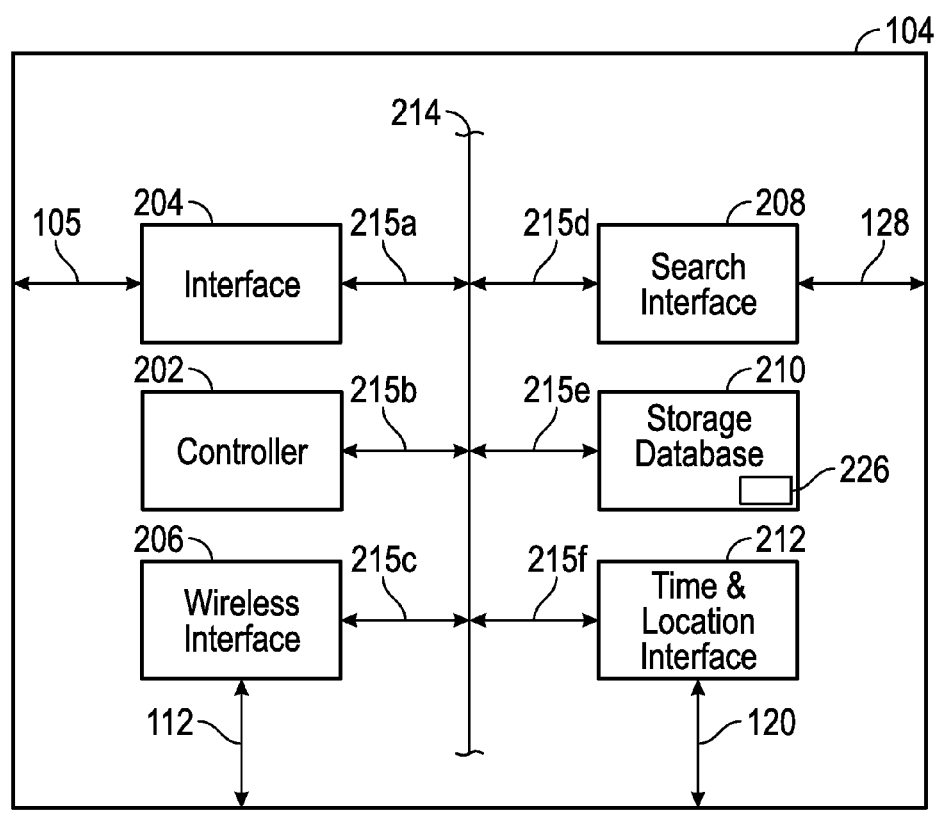
FIG. 2 is a block diagram of the present invention.

Referring now to FIG. 2, a block diagram is shown illustrating, with more particularity, a virtual database 104 for use in the system of FIG. 1. The database of FIG. 2 includes a plurality of network and/or device interfaces 204, 206, 212, a searcher interface 208, a storage database 210, and a controller 202.

The controller 202 may control operation of the virtual database 104, and entry of information passing to the virtual database into storage database 210. The controller may be a controller known to those skilled in the art, such as a DSP, comparator, bus controller, or the like, for example. The controller may be resident as hardware or software, as will be apparent to those skilled in the art, and may be programmable. The controller 202 accesses data from at least one data source within, and/or associated with, the virtual database 104. For example, the storage database 210 is controlled by controller 202, and may include data entered by a user, and/or data obtained via the transaction monitors 122, 116, and/or may include an overall model of the user, and/or may include a cache for the temporary storage of incoming information. The cache may retain the data within the storage database at least until the updating of the overall model. The user may enter data via the controller 202 by, for example, entry over a network interface 204, such as by typing or voice over-IP, or entry over a wireless interface 206, such as by voice recognition or keypad entry on a cellular telephone 108. Data entry may be performed by the user in response to a data entry menu, or similar data entry request. A data entry request may be presented to the user upon a first use of a device, such as in response to entry of a username and/or password, or upon each use of the device. The data entry menu may provide for multiple choice answers, or multiple choice selections, for at least one polling questions, such as "are you hungry: Y or N?", and answers may be selected by click and select, by key press, by a drop down menu, and/or by voice recognition. The data entry menu may allow for entry of any data, such as by text response, numeric response, or speaking response. Data entry may include, for example, a direct data entry, a user request for search entry, or modification of current data by the user.

Network interface 204 may be in communication with controller 202, and may be connected via link 105 to provide access to information entered, for example, by the user, such as from a personal computer or a device monitor. Controller 202 may accept information from a wireless communication device via, for example, link 112 and the wireless data interface 206, as interactive input, as entered data, or as data batched data at, or directly from, a device monitor, such as a base station 110 or a time and location monitor 116. Controller 202 may additionally accept information from the time and location monitor 116 via a dedicated time and location interface 212, such as time and location of at least one transaction. This time and location may be accessed directly, or over the network, by the monitor 116.

For example, the user may utilize the wireless device to access profile information and enter a preference for black shoes to be purchased every 2 months. If the user is to receive a targeted message about a particular item, such as, for example, the shoes, the user may enter the word "shoes" into the wireless device, and interface 206 may accept that information as a search request data entry, pass the information to the search interface 208, and may accept a returned messages from the searcher 126, wherein a tailored message or advertisement is returned to the user in accordance with black shoes, and may additionally be targeted at a shoe purchase within two months of a previous shoe purchase. This information may additionally be generated heuristically, such as wherein the heuristic model within the virtual database 104 assesses that the user makes a call from a location proximate to a given shoe store approximately every two months, and, according to the transaction monitor 122, purchases black shoes every two months, and therefore the user is estimated to purchase black shoes from that given shoe store every two months, thus necessitating a targeted message from searcher 126 regarding those shoes in that time frame at that location. A search for targeted messages may be performed by searcher 126, in accordance with the information, in order to locate black shoes on sale at that store in the two month interval, and in order to convey the results of that search to the user. Alternatively, if the targeted message sent to the user was confirmed as received by the user, and was recorded as acted upon by the user, such as by the monitoring of a purchase transaction, that selection may be entered as a preference in the storage database 210, such as by entry into the overall model for that user.

The controller 202 and/or the storage database 210 may include therewithin a simulator of human responses, such as a heuristic modeler 226. This heuristic modeler 226 may be programmed as software, and may have associated therewith a plurality of comparison information, or may include hardware, such as a comparator, in conjunction with the programming, or may reside in hardware only. In the example hereinabove, the controller may cause a simulation of selection of data, which selection may be based on known user preferences, and may interpret that simulated selection data in order to predict the actions of a person associated with those known preferences in the storage database 210. Heuristic predictions may thus be based on the data gathered by the user input, and/or user transaction monitoring, entered by controller 202 to storage database 210. For example, for a user that has entered that a hobby is baseball, and/or that has recently purchased a baseball card for a player on the San Diego Padres baseball team, and/or that frequently watches or listens to San Diego Padres baseball game telecasts on radio, television, or internet, according to the transaction monitoring, and that is then-present in San Diego, according to the time and location monitor, the controller 202 may cause the storage database to assess that the user is a fan of Padres baseball, by comparison to data of other parties that engage in similar transactions, and may consequently cause, via searcher interface 208, a search to be performed by searcher 126 as to whether the Padres are playing a game, that day, in San Diego. If that search results in an affirmative response, a targeted message may be sent to that user suggesting a trip to a Padres game that evening.

The heuristic model may be co-located in the controller 202 and the storage database 210, and may include a plurality of predictive rules as to human behavior. The heuristic model may accept direct data, as well as monitored data obtained by monitoring the transactions, locations, such as times of transmissions and/or transactions from and by the user, such as from the wireless device 108. In an exemplary embodiment, a weighting may be assigned to actual direct data and transaction monitoring data, such as approximately 80% for a particular user, in the overall model. This percentage may be dependent, for example, on the amount of information about that user currently available within the storage database 210. For example, if only two data items are present with respect to a particular user, and wherein ten data items are desired for the overall model, the 80% weighting may be adjusted to reflect that only 20% of the direct data desired is available. In such an embodiment, the 80% weighting might be adjusted to a 16% weight (80%×20%). The remaining percentage of the overall model may be heuristically defined, such as by the application of the plurality of predictive rules within the storage database 210 and/or the controller 202, by the controller 202, to the direct and monitored data. The predictive rules may include, for example, data on known general behavioral patterns of other persons, which general behavioral data may be gained by data entry to the controller, such as by a system controller, by monitoring, such as over the Internet, by financial monitoring, such as monitoring of all purchases by a category of persons, or by monitoring of multiple users of the system of the present invention, for example. The overall model may thus be used to generate a probabilistically desirable search for the searcher 126 on behalf of the user.

Probabilistic entries may, for example, be generated by subjecting to a statistical probability analysis, as will be known to those skilled in the art, data resident in the storage database 210, as compared to, for example, the predictive rules on general behavior. For example, a plurality of statistical databases may be included in the storage database 210, and such databases may be relational in form. For example, an entry may be made that includes information that 80% of all persons interested in art are also interested in theater. This probabilistic data may be entered, via the controller 202, to the storage database 210 by, for example, a controller interface, wherein the relations and the data entered are of interest to the targeted message generators, such as vendors. These relations of interest may be directly entered by a targeted message generator programmer, or by at least one vendor via a vendor access 129, for example, or may be assessed via, for example, an automated Internet data search, such as a spidering search.

In the example hereinabove, the monitor 116 may repeatedly locate a user as being within a local art museum, such as by monitoring cell phone call origination location, or by monitoring purchase of museum tickets, for example. This repeated locating may implicate a rule that, if a user is assessed as being at an art museum more than twice in a two week time period, that user is interested in art. The controller may then apply the heuristic rule stated hereinabove to assess that there is an 80% chance that the particular user repeatedly located in the art museum is also interested in theater, and, in response to this high probability, the controller may generate a command to the searcher to search for theater performances at a given time, such as 30 minutes after the museum closes, in a given area, such as within 2 miles of the art museum. Thus, the predictive rule may not only be implicated, but additionally may be "intelligently" applied in a manner to allow for sufficient time for a then-current activity to end, or sufficient time for user convenience, such as by assessing the proximity of the two perceived locations of interest. For example, the heuristic rule may state that 80% of all persons eat dinner between 6 pm and 8 pm, and that 90% of all art museum patrons have an annual salary in excess of $60,000, and that 70% of all patrons of 4 star and 5 star restaurants also have an annual salary in excess of $60,000, and that 90% of all art museums close between 5 pm and 6 pm, and, consequently, that there is a 45% probability (80%×90% ×70%×

90%) that a search should be generated for a targeted message to the current user at the museum for a or 5 star restaurant, within 5 miles of the art museum, between 6 pm and 7 pm. This heuristic model that contributes to the overall model may additionally include limitations as to minimum probabilities, such as 50% or greater, before a search is allowed to be generated.

For example, the heuristic modeler may include a series of inter-related relational databases. An actual user characteristic obtained from the user, and/or via device monitor may be used to locate a high probability event in a first database. Location of a high probability event in the first database may cause the location, within the storage database, of relationally high probability events in that first database, or other of the inter-related databases.

In an exemplary embodiment, data may be taken as to the location of a user at certain times of the day, week or month. If the time and location of the user is assessed as periodic, statistical analysis may draw a conclusion from the data, and may enter the conclusion as new data into the storage database 210. That is, if the data indicates that it is statistically significant that a user will be in a certain location at a specific day and time, that conclusion may be entered into the storage database 210 as data associated with an appropriate probability. That data and the resulting probability of that event may then be accessed as included in an overall model by the search engine 126.

In general, the highest probability of success for a targeted message occurs if the location or interests or needs or desires of the user can be predicted at a specific time, and if only the most relevant messages are transmitted to the user at, or slightly prior to, that predicted time. Thus, heuristic model statistical analysis within the overall model in the storage database 210 may be used to predict the locations, interests, needs, and/or desires of the user to within a specific probability, and to target messages accordingly. Should the user engage in behavior not predicted by the heuristic model of the overall model, the probability of the predicted event may be adjusted appropriately based upon the actual user behavior recorded in the direct and monitored data of the overall model within the storage database 210.

A Kalman filter predictor predicts the error of a prediction as compared to data actually encountered. In the case of the virtual database 104, the error of a prediction is in the occurrence or non-occurrence of a user engaging in a predicted transaction, or the user being at a predicted location. If the user changes patterns significantly, the heuristic estimations and the probability of the estimated occurrence may be corrected to bring the prediction within acceptable error, such as in accordance with known Kalman filters. Also in accordance with known error prediction filters, the predictive error decreases as more actual observation data is gained in the present invention.

In general, select types of user periodic behavior may be predicted with very high accuracy through the use of the present invention, and such high accuracy periodic behaviors may improve the predictive error of other behaviors. For example, the occurrence of anniversaries and birthdates for family, friends, and business associates, once known to the storage database 210, can be predicted with high accuracy, and are predictably recurrent. As such, these events may have a probability of nearly 1.0 within the overall model. In an exemplary embodiment wherein an anniversary occurs on October 25, and flowers are purchased for two consecutive anniversaries, the recurrent nature of the anniversary allows for a high probability prediction that the anniversary will occur again on the following October 25, and the monitored behavior leads to a prediction that flowers will be desired, and, as such, a direction may be forwarded via the searcher interface 208 to search for messages regarding flowers, such as in a then-current location of the user.

The controller 202 may sort, classify, and/or store data entered by the user, and entered by the transaction monitors. The controller 202 may additionally cause the generation of, sort, classify, and/or store, predictive data resulting from the transactions of the user, and the probabilities related thereto. These actions of the controller form the overall model of the particular user in virtual space, which virtual user is stored in the storage database 210. The stored data of the storage database 210 may be used to generate messages through delegation by the controller 202 to the searcher 126. In order to generate a delegation to the searcher, the controller 202 utilizes the searcher interface 208, via link 128, to access the searcher. The controller may be in communication with the monitor interfaces 204, 206, 212, and the searcher interface 208, over, for example, a bus architecture including a bus 214 with interfaces 215$a$-$f$, thereby providing direct access by the monitor interfaces and the searcher interface to the overall model in the storage database 210.

As set forth hereinabove, the storage database 210, in conjunction with controller 202, may allow for a plurality of input modes, selectable by the data gatherer, or by the user. In a data input mode, the user may add, delete, or modify user data in the storage database 210. A menu for the user may be presented by the controller in accordance with the selected input mode, and may allow the user to select the category of information that the user wishes to change or enter. Once a data category is selected, the user may be provided with any existing data for review. The user may then enter new or modified information, using methodologies apparent to those skilled in the art, such as a mouse, keyboard, keypad, stylus, or voice, for example, on a networked computer, personal digital assistant, or wireless communications device, for example. Other data entry formats and methodologies will be apparent to those skilled in the art.

In a message request mode, or search mode, the user may wish to make a query. It should be noted that, wherein the user enters a query, the controller may forward the request to the searcher via the searcher interface 208, similarly to an embodiment wherein a search request is hueristically generated. The transference of the query to the searcher from the controller 202 is preferably transparent to the user. The user may enter a specific, or a general, message request, via interfaces known to those skilled in the art, which request may be forwarded to controller 202 via device interfaces 204, 206. For example, the user may enter a request for an advertisement for "pizza". The nearest pizza parlor to the then-current location of the user, that is open at the current time, as assessed, for example, via the time and location monitor 116 over the interface 212, that can accommodate the user, might then be returned from the searcher 126, via interfaces 208 and 206, in response to the query. Additionally, for example, if the user entered the word "suit", a targeted message regarding a suit from a local retailer might be provided, wherein the location of the local retailer, the hours of operation of the retailer, and the type of suit available from the retailer might be in accordance with the overall model.

Returning now to FIG. 1, the present invention processes a message request via the searcher 126, which message request may be controlled directly by the user, and/or may be controlled in accordance with the overall model, and via the controller 202, as set forth hereinabove. Vendor data access 129 is also preferably in communication with, and/or exerts control over, the virtual database 104.

Vendor data access 129 may include information for messages and advertisements, as entered and/or controlled by vendors, and is preferably accessible by searcher 126 via link 127. Vendor data access 129 may include, for example, databases, such as in relational format, links, such as internet links or hyper-links, or other textual information. Vendor data access 129 may be a compilation of vendor supplied data that is available for searcher 126 use, and the vendor data therein may be prioritized for return in a search by searcher 126. For example, each participating vendor may pay a fee, and the amount of the fee paid may allow a vendor access to vendor data access 129, or may cause a particular vendor to be returned in the first position in response to a particular search, a particular vendor to be returned second, and so on. Thus, particular vendors may have a "most favored", or a "more favored" status. Vendors subscribing may provide specific messages, and/or may provide basic data for generation of messages by searcher 126. A vendor may provide data, for example, via a network connection 132 to a network site, or via an alternative link 134, such as a wireless link, such that a vendor may push data into the vendor data access 129. Alternatively, the vendor data access 129 may query the vendor via connections 132, 134 for updated messages. Links 132, 134 may tie one or more vendors to a private or semi-private network, such as for vendor data polling. Additionally, vendors may enter particular characteristics of users to which the vendors wish to target messages, such as particular characteristics in storage database 210. More current data, and more current targeting data, from a vendor will, in general, generate a more positive response by users to messages from vendors.

Searcher 126 preferably utilizes the overall model to respond to, and/or to predict, the needs or desires of the user. For example, if it is known by the storage database 210 that the user gets a haircut once every five weeks, a prediction may be made in the overall model within the virtual database 104 as to when the next haircut is needed, and a search may be generated for the searcher 126, either automatically, such as every 4 weeks, or in accordance with a user request. The search generated may be for any haircut vendors, such as by accessing an internet search or an internet search engine by searcher 126, for any hair cut vendors having a targeted message, for local vendors having a targeted messages, or for any local vendors, and may particularly be for local vendors offering specific discounts, and/or for local vendors within 5 miles of the home of the user, or local vendors within 5 miles of the then-current location of the user, and/or local vendors specializing in a particular style of haircut, for example. The instructions for these priorities for the search are forwarded by the controller 202, and may be in accordance with user instructions, and/or in accordance with data in the storage database 210 entered by the user and/or heuristically generated, such as data in the overall model.

Matching results, having sufficient probabilities, may be returned by the searcher 126. The searcher 126 may present all matching results, or may weight results for presentation, or may weight results for pseudo-random selection. For example, a first matching result may receive two points for return, due to the payment of a higher fee by the providing vendor, for example, and second and third vendors may each receive one point for return, due to the payment of lower fees by the providing respective vendors. Thus, in an embodiment wherein a single message is to be returned, the first vendor may have a 50% chance of random selection (2 points out of 4 total), and the second and third vendors may each have a 25% chance of selection (1 point each out of the 4 total).

Figure 3:
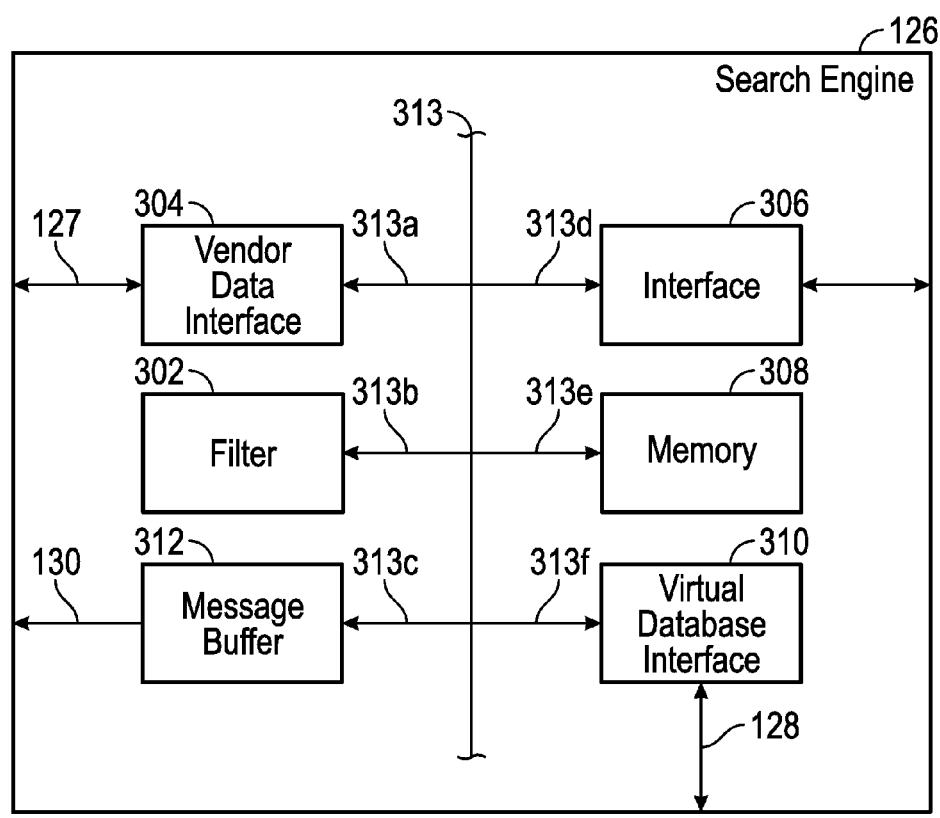
FIG. 3 is a block diagram of the present invention.

FIG. 3 is a block diagram illustrating an exemplary embodiment of the searcher 126. The searcher 126 is accessible to, and may be controlled by, virtual database 104. The searcher 126 may include filter 302 that identifies messages relevant to an inquiry, and that may tailor messages to a particular request or to a particular user profile. The filter 302 accesses vendor data or basic message information from subscribing vendors at vendor access 129 via the vendor data interface 304, and may access generally available information, such as internet information, over interface 306. The internet interface 306 may be utilized to access general information from the internet such as weather information, transportation schedules, and accident reports, either by a search performed by filter 302, or by accessing available Internet search engines known to those skilled in the art. Data that is accessed may be placed into memory 308 for accessibility, such as for subsequent searches, in order to expedite those subsequent searches. Memory 308 may be any memory apparent to those skilled in the art, such as a cache, RAM, ROM, or the like.

The virtual database interface 310 of searcher 126 may communicate with the virtual database 104 via link 128, and may communicate directly with storage database 210. Link 128 may include a buffer for buffering requested, or pushed, user data. A message buffer 312 may store, include, or construct a message, or a targeted message, from a vendor or other data source. A bus 313 using links 313a-f may be used to interconnect the elements of the searcher 126.

The filter 302 may scan available resources, such as vendor services, and may locate opportunities for advertisements or messages in accordance with instructions received from controller 202. It will be apparent to those skilled in the art that searcher 126 may include a controller independent from controller 202, or that controller 202 may be included entirely within, or partially within, the searcher, rather than entirely within the virtual database 104. The filter 302 may filter search results in accordance with additional received instructions, in addition to the search instruction or request, such as time, date, location, hours of operation, or transaction type constraints, which additional instructions may be accessed from vendor-entered data, such as in a database separate from search instructions. The filter 302 may acquire these additional instructions at any time prior to, or simultaneously with, generation of a search result, such as upon entry by the user, or by a vendor, upon assessment by a device monitor, or concurrently with receipt of the search instruction. In an embodiment wherein the additional instructions are received prior to the search instruction, the additional instructions may be stored in the message buffer 312. In an exemplary embodiment of additional instructions, the time and location of the user, and the location of at least one vendor, and the operating hours of that vendor, may be necessary in order to assess the availability of vendor messages from that vendor to that user on a search topic. For example, additional instructions may include that messages may be available, with priority granted to the most current messages, such that the current time and location of the user may optimally be proximate to the location and operating hours of the vendor or the services.

Thus, available vendor messages may be matched with a location and the time of day, and/or with other additional instructions, and/or with at least one aspect of the overall model in the virtual database 104, in order to match a potential message with the needs and/or desires of the user. As user response to messages may be tracked by the vendors, such as by the device monitors, vendor access 129 may additionally be used to indirectly and continuously update the overall model in virtual database 104. Further, the filter 302 may match a message against a probability of success of that message, based upon a perceived success of other or similar messages, in order to select a message. A high probability is indicative of a high likelihood that the message may be favorably received by the user. For example, the messages having the highest probability of success may receive a highest priority for transmission to the user.

Figure 4:
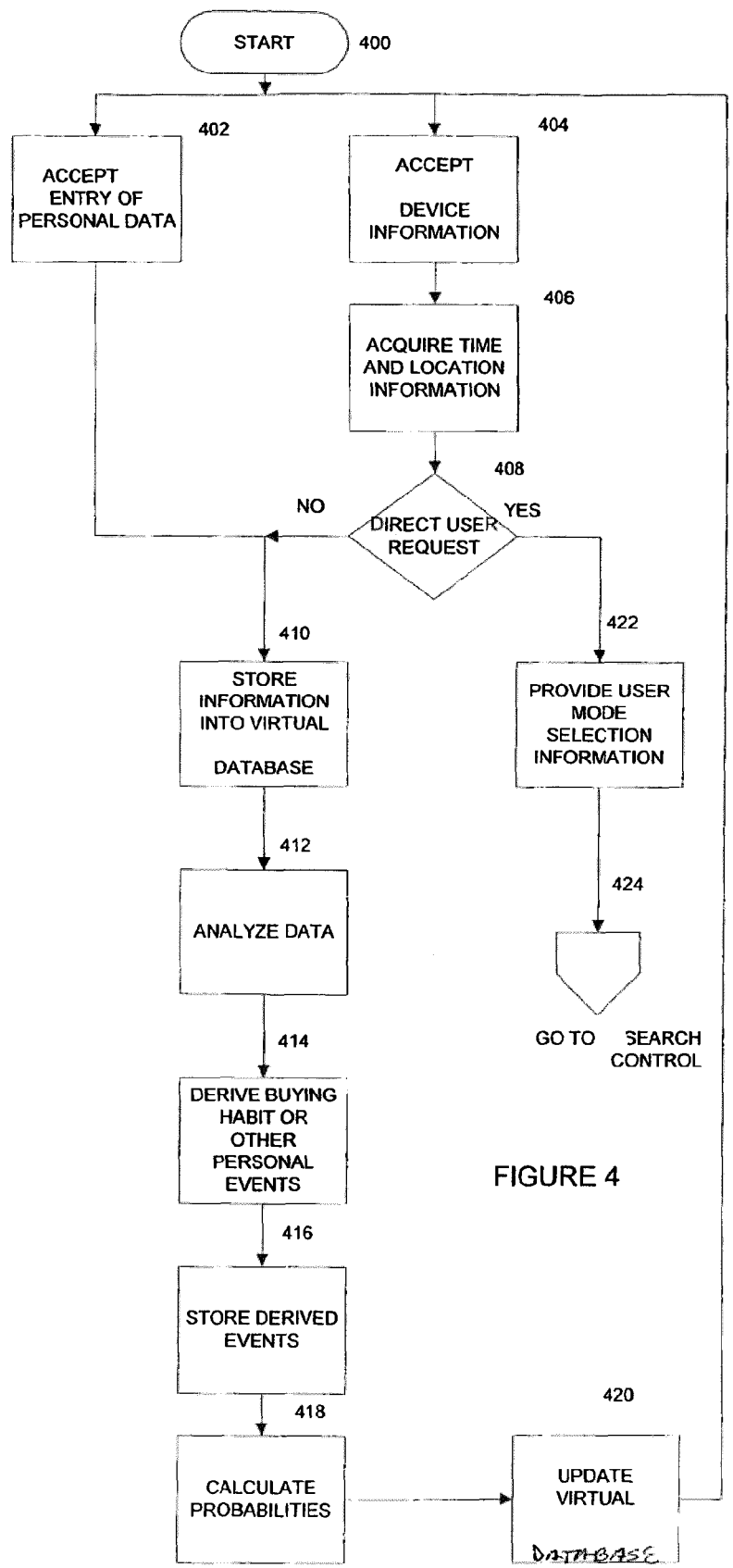
FIG. 4 is a flow diagram of the present invention.

FIG. 4 is a flow diagram illustrating an exemplary heuristic method of performing message searches. The method begins 400 with the building of the virtual database 104 and overall model. The user may log into a personal site to enter user information, and a controller may accept the data entries of the personal data 402, and may store that information 410 into the virtual database 104. The information in the virtual database 104 may be analyzed 412, and transactional habit and personal preference data and events may be extracted or extrapolated by a heuristic model 414 and stored 416 in the virtual database 104. The probability associated with a new behavior is calculated and appended to the derived data 418, and the virtual database 104 and overall model are updated 420. Alternatively, an input may be accepted from the device information 404, and time and location information 406 may be acquired. Time and location may be stored in the virtual database 104, or may be interactively exchanged to assess whether and/or when and/or where the user seeks to make a direct request for information 408.

If a direct request is made 408, the controller may provide an interactive dialogue with the user on the wireless device. This interactive exchange may include the presentation of mode selection 422, or the acceptance of instructions for a topical or terminology search. If a search is requested, then a searcher may assume control of the exchange 424 in order to provide search functions.

Figure 5:
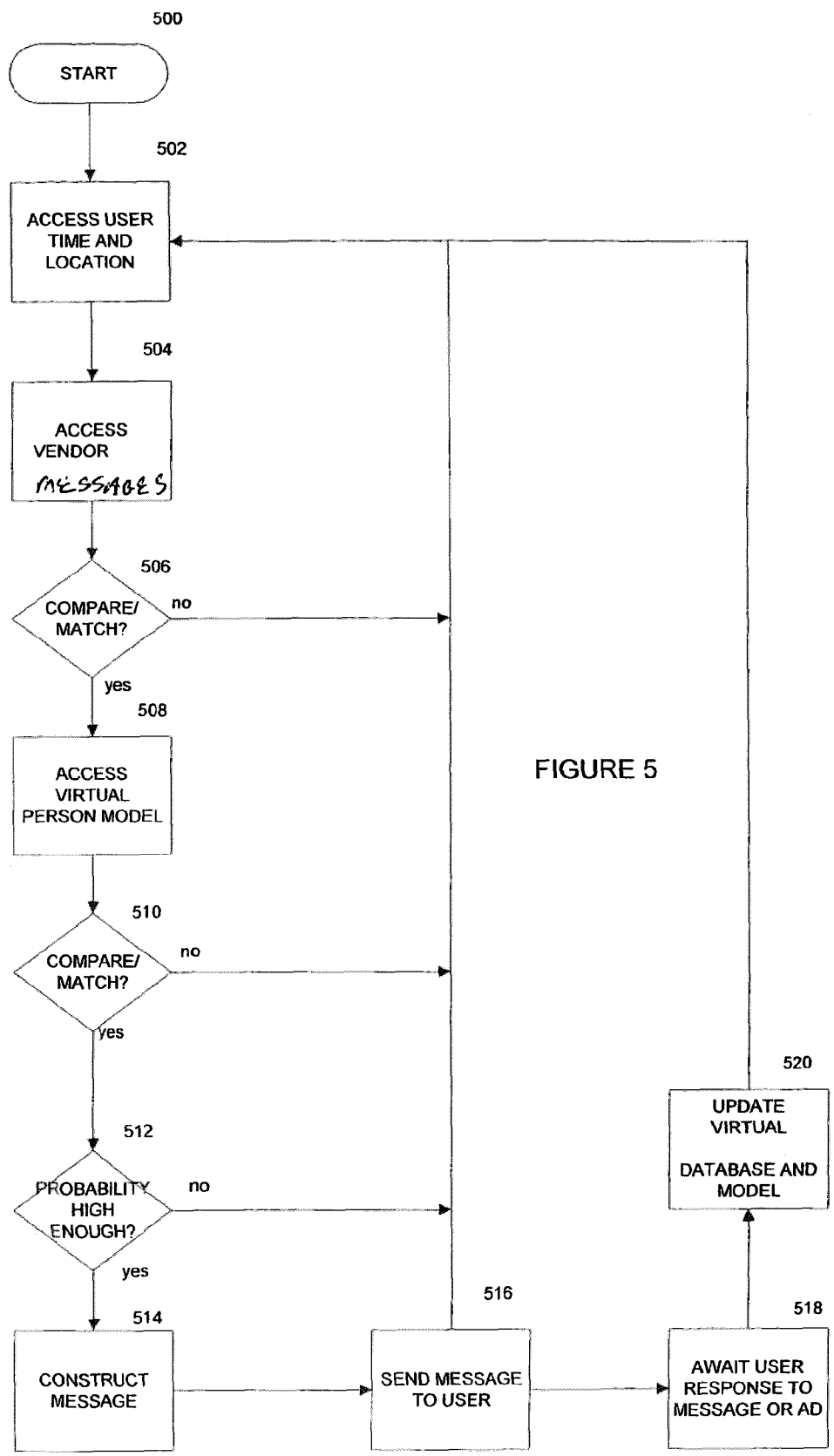
FIG. 5 is a flow diagram of the present invention.

FIG. 5 is a flow diagram illustrating a heuristic methodology for use in the present invention. Upon initiation 500, the controller assesses user time and location, and/or transaction, information 502. The searcher may be initiated automatically when the user device monitored in step 502 is activated. Activation may be defined as a turning-on, or the transmittal of a user action, such as a search, or a call or dial-in. The controller may access vendor messages 504 via, for example, a vendor data access point. The time and location and/or transactional data may be compared 506 with the available vendor messages, and a determination of message applicability may then be made. If the comparison results in a potential message, the virtual model 508 may be accessed to gain insight into the applicability of the message to that user. The results are compared 510, and if a favorable match to the profile is available, the probability of success 512 of the message may be assessed.

If the probability of a successful event is sufficiently high, the message may be constructed 514 and sent to the user communication device 516. Upon selection of a message, the message may be personalized for the preferences or the needs of the user. For example, the format of the message may be adjusted to fit the display of the user communications device during construction 514 or issuance 516. After the message is sent, the response by the user is awaited 518 for success or failure, such as by monitoring a transaction monitor at the vendor associated with the message, or by querying the user to assess an interest level of the user, to thereby provide system feedback. If received, the feedback is recorded 520 in order to assist in predicting future transactions.

It will be apparent to those skilled in the art that, in the course of selection and construction of messages, the probability of success may be assessed differently with respect to different modes of operation, or different types of messages or advertisements. For example, automobile advertisements may be considered highly successful if the advertisements meet a 5% probability of success, while restaurant advertisements must meet a 30% probability of success. Additionally, if the user requests an advertisement, messages may be sent freely, highest probability first, for example, due to the overall high probability that the user desires the information. On the other hand, only messages meeting a minimum probability of success may be selected in an embodiment wherein a message is selected automatically, such as in accordance with a time, date, and location of the user.

The search capabilities of the present invention may include an open request mode, wherein the user requests delivery of messages associated with a term, and with the profile of that user, rather than searching for a specific term. For example, a user might enter the term "food", and the search might proceed to locate restaurants, in the area then-local to the user, having messages available. Additionally, for example, if a user were in the East end of a town, and selected the open request mode, and entered a blank search, all advertisements of interest to that profile, location, and time might be located. If multiple messages were located, the messages might be sent to the user in a priority order based upon the relative probabilities of success.

It will be noted that assessing the location of the user in the present invention may be accomplished by a variety of methods, as will be apparent to those skilled in the art, such as, but not limited to, a global positioning system, geo-location using triangulation, such as with telephone towers, internet IP addresses, and/or landline telephone caller identifications. Similarly, assessing the time of user transactions and predictions may be accomplished in a variety of ways, as will be apparent to those of ordinary skill in the art, such as by a device clock in communication with a device monitor, an external system clock, internet time, or global position time.

It will be apparent to those skilled in the art that various modifications and variations may be made in the apparatus and process of the present invention without departing from the spirit or scope of the invention. Thus, it is intended that the present invention cover the modification and variations of this invention provided that those modifications and variations come within the scope of the appended claims and the equivalents thereof.

What is claimed is:

1. A targeting system comprising:
   a virtual database comprising at least one processor, the virtual database accessible to at least one communications device over at least one network, wherein the virtual database further comprises:
   at least two actual user characteristics accepted over the at least one network, wherein the at least two actual user characteristics comprise at least one user profile accepted from a user over the at least one network by the virtual database, wherein at least two of at least one of the at least two actual user characteristics are batched prior to acceptance over the at least one network by the virtual database, and wherein the at least two actual user characteristics are accepted from the user,
   a heuristic modeler that generates at least one heuristic user characteristic in accordance with the at least two actual user characteristics, wherein the at least one heuristic user characteristic corresponds to a heuristically determined response to a question, and
   at least one inquiry generator, wherein at least one of the at least two actual user characteristics is generated from a response provided by the user, wherein the response is stored within the virtual database, and wherein the response is temporarily stored to form, in conjunction with the at least one heuristic user characteristic, an overall model of the user within the virtual database;

a searcher that provides advertising content to the at least one communications device over the at least one network, in accordance with at least the at least one heuristic user characteristic; and at least one monitor, wherein the at least one monitor monitors the at least one communications device, wherein at least one of the at least two actual user characteristics of the virtual database is varied in accordance with at least one output of the at least one monitor and wherein the at least one monitor provides at least one actual characteristic comprising at least one selected from the group consisting of time of activity information and position of the activity information, current time information, current position information, and behavioral pattern information.

2. The targeting system of claim 1, wherein the at least one network comprises at least one selected from the group consisting of an internet, an intranet, a direct dial-in network, and a wireless network.

3. The targeting system of claim 1, wherein the at least one communications device comprises a wireless communications device.

4. The targeting system of claim 3, wherein the wireless communications device comprises at least one selected from the group consisting of a cellular telephone, a programmable digital assistant, a short range wireless device, a laptop having a modem, and a web-enabled wireless device.

5. The targeting system of claim 1, wherein the at least one communications device comprises at least one selected from the group consisting of a computer and a television.

6. The targeting system of claim 1, wherein the at least one monitor comprises at least one selected from the group consisting of a time monitor and a location monitor.

7. The targeting system of claim 1, wherein the at least one monitor records at least one selected from the group consisting of activity on a television, on a telephone monitor, on the at least one network, and on a purchasing point.

8. The targeting system of claim 1, wherein the at least one monitor comprises at least one selected from the group consisting of a database, at least one storage memory, and at least one batching memory.

9. The targeting system of claim 1, wherein access to the at least one user profile is restricted.

10. The targeting system of claim 1, wherein the virtual database is two-way accessible to the at least one communications device over the at least one network.

11. The targeting system of claim 1, wherein the virtual database further comprises at least one memory, at least one database, and at least one comparator.

12. The targeting system of claim 1, wherein the virtual database further comprises a real-time cache, and wherein at least one of the at least two actual user characteristics is real-time cached in the real-time cache.

13. A method comprising:

obtaining, by a virtual database comprising at least one processor and accessible to at least one communications device over at least one network, at least two actual user characteristics accepted over the at least one network, wherein the at least two actual user characteristics comprise at least one user profile accepted from a user over the at least one network by the virtual database, wherein at least one of the at least two actual user characteristics is according to a response by the user to an inquiry from at least one inquiry generator included in the virtual database, wherein the response is stored within the virtual database, wherein at least two of at least one of the at least two actual user characteristics are batched prior to acceptance over the at least one network by the virtual database, and wherein the at least two actual user characteristics are accepted from the user;

generating, by a heuristic modeler included in the virtual database, at least one heuristic user characteristic in accordance with the at least two actual user characteristics, wherein the at least one heuristic user characteristic corresponds to a heuristically determined response to a question, wherein the response is temporarily stored to form, in conjunction with the at least one heuristic user characteristic, an overall model of the user within the virtual database;

providing, by a searcher in accordance with the at least one heuristic user characteristic, advertising content to the at least one communications device over the at least one network; and monitoring, by at least one monitor, the at least one communications device, wherein at least one of the at least two actual user characteristics of the virtual database is varied in accordance with at least one output of the at least one monitor and wherein the at least one monitor provides at least one actual characteristic comprising at least one selected from the group consisting of time of activity information and position of the activity information, current time information, current position information, and behavioral pattern information.

14. The method of claim 13, wherein the at least one communications device comprises a wireless communications device.

15. The method of claim 14, wherein the wireless communications device comprises at least one selected from the group consisting of a cellular telephone, a programmable digital assistant, a short range wireless device, a laptop having a modem, and a web-enabled wireless device.

16. The method of claim 13, wherein the at least one communications device comprises at least one selected from the group consisting of a computer and a television.

17. The method of claim 13, wherein the at least one monitor comprises at least one selected from the group consisting of a time monitor and a location monitor.

18. The method of claim 13, wherein the at least one monitor records at least one selected from the group consisting of activity on a television, on a telephone monitor, on the at least one network, and on a purchasing point.

* * * * *